United States Patent [19]

Hay

[11] Patent Number: 5,499,790
[45] Date of Patent: Mar. 19, 1996

[54] ANTIVIBRATION/ANTISHOCK DEVICE AND THE PROCESS FOR THE FABRICATION OF SUCH A DEVICE

[75] Inventor: Jean-Yves Hay, Colombes, France

[73] Assignee: SOCITEC - Societe pour le Commerce International et les Echanges Techniques, Sartrouville, France

[21] Appl. No.: 195,228

[22] Filed: Feb. 14, 1994

[30] Foreign Application Priority Data

Feb. 22, 1993 [FR] France .................................. 93 01995

[51] Int. Cl.⁶ .................................................. F16M 13/00
[52] U.S. Cl. ........................... 248/570; 188/378; 267/148
[58] Field of Search ................................ 248/570, 569, 248/568; 267/33, 152, 153, 148; 188/378

[56] References Cited

U.S. PATENT DOCUMENTS

| | | | |
|---|---|---|---|
| 3,204,913 | 9/1965 | Lawrence | 248/570 |
| 3,596,865 | 8/1971 | Camossi | 267/148 |
| 4,586,689 | 5/1986 | Lantero | 248/570 |
| 4,783,038 | 11/1988 | Gilbert | 248/638 X |
| 5,062,507 | 11/1991 | Roche | 188/378 |
| 5,169,110 | 12/1992 | Snaith | 267/148 X |
| 5,277,394 | 1/1994 | Slemmer | 267/166 X |

FOREIGN PATENT DOCUMENTS

| | | | |
|---|---|---|---|
| 0499518 | 8/1992 | European Pat. Off. . | |
| 1375626 | 9/1964 | France | 248/570 |
| 2189660 | 1/1974 | France . | |
| 2601739 | 1/1988 | France . | |
| 7306006 | 5/1973 | Germany . | |
| 994762 | 6/1965 | United Kingdom | 248/570 |

*Primary Examiner*—J. Franklin Foss
*Attorney, Agent, or Firm*—Kenyon & Kenyon

[57] ABSTRACT

An antivibration/antishock device comprising a carrier element (11) and a carried element (12) linked by cable (13a, 13b), wherein the carrier and carried elements each have at least two anchoring points for the cable placed in the neighborhood of the apices of a polygon with n apices, wherein the cable is alternately anchored to a point (140) of the carrier element (11) and to a point (141, 141') of the carried element (12) and is oriented on the anchoring points (140) of a first (11) at least of said elements in a roughly transverse direction to the radial direction, wherein the carrier or carried element is a modular element (11a, 11b) comprising, on the one hand, individual anchoring modules (11a, 11b) and, on the other, assembly means (15, 17, 21) of said modules, and, further, while the process is one wherein:

in a first so-called 'anchoring' phase, the cable is anchored, on the one hand, in each of said anchoring modules of the modular element, and, on the other, in the other element, and in a second phase, the modular element is assembled.

3 Claims, 8 Drawing Sheets

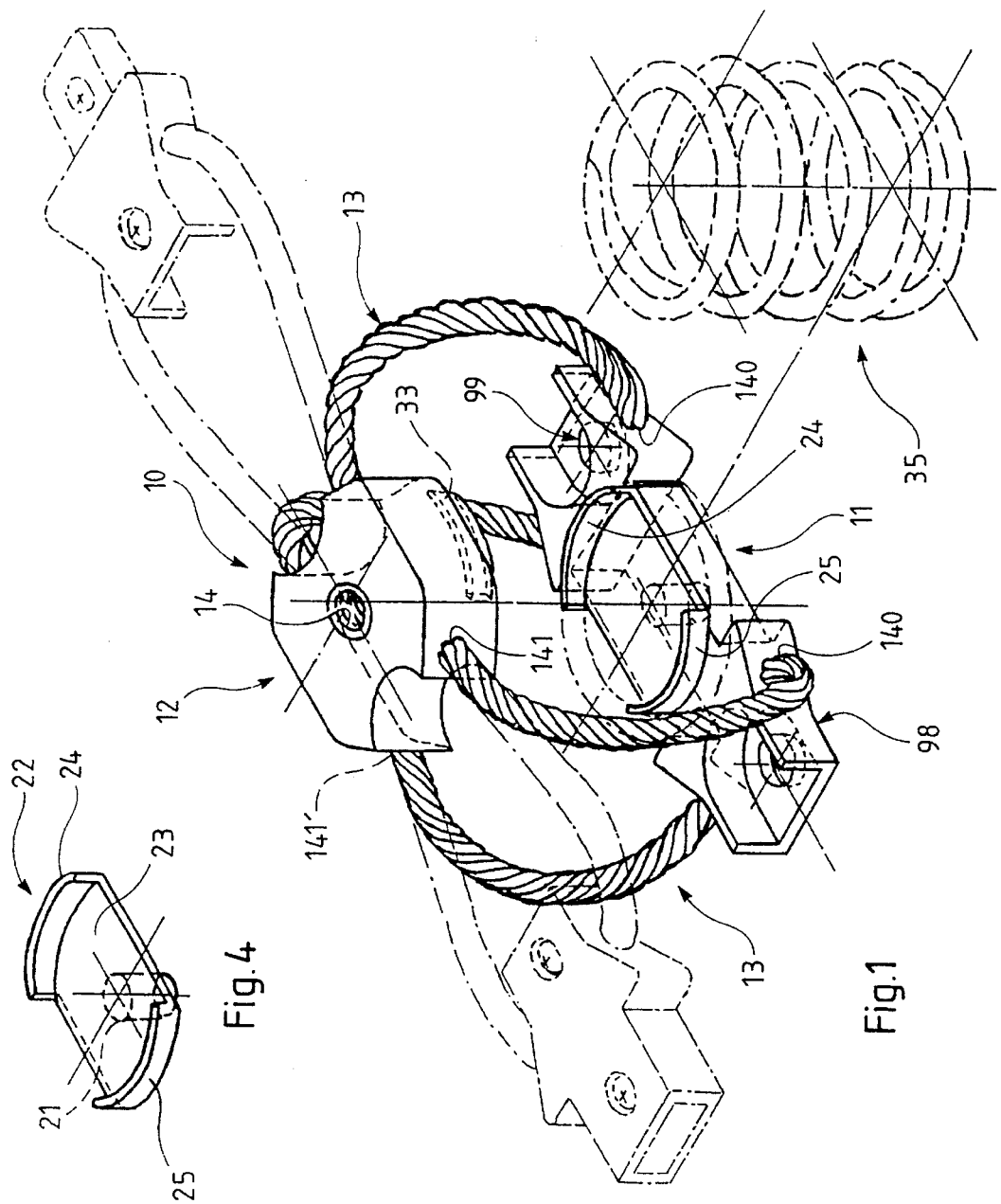

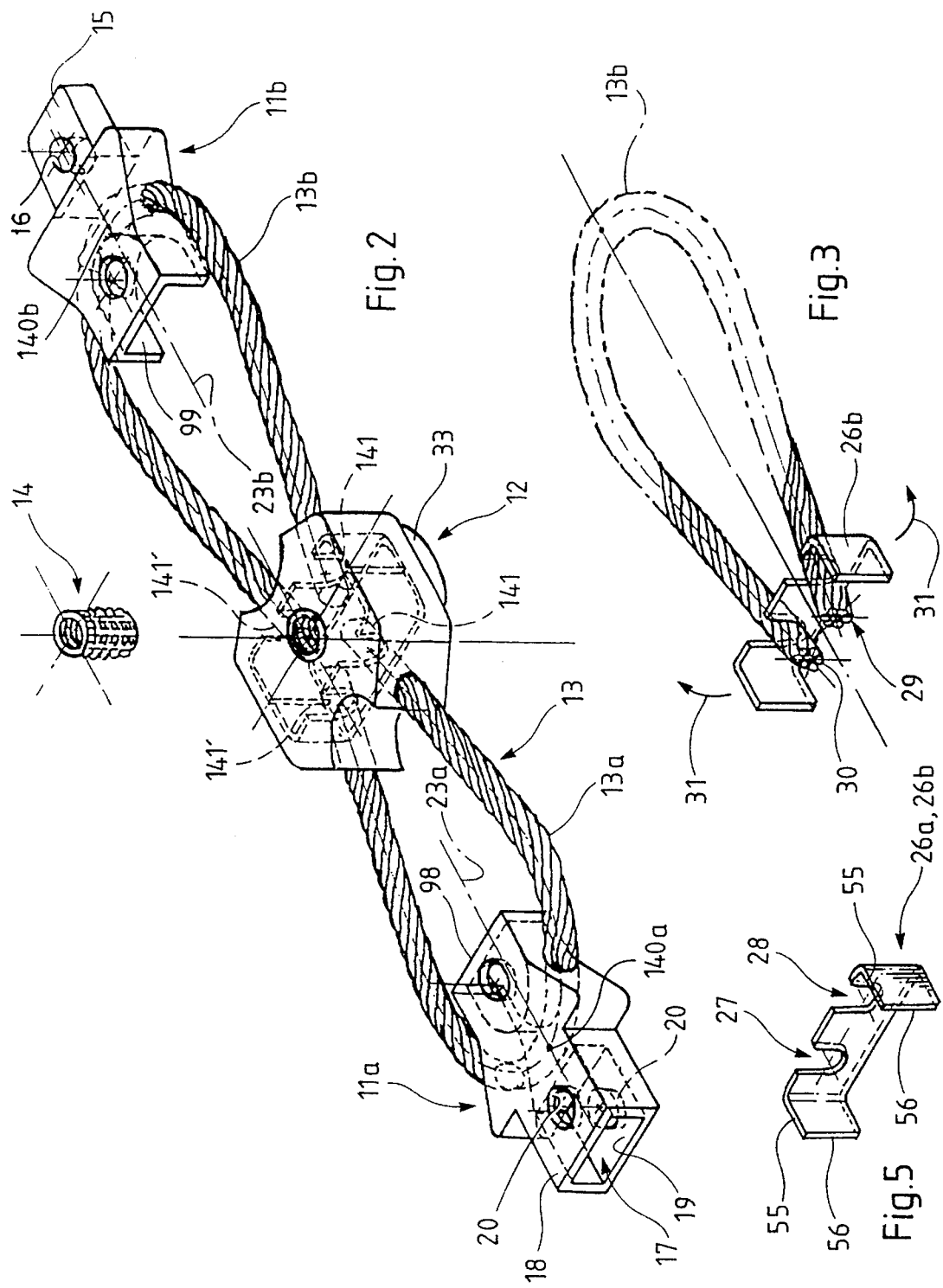

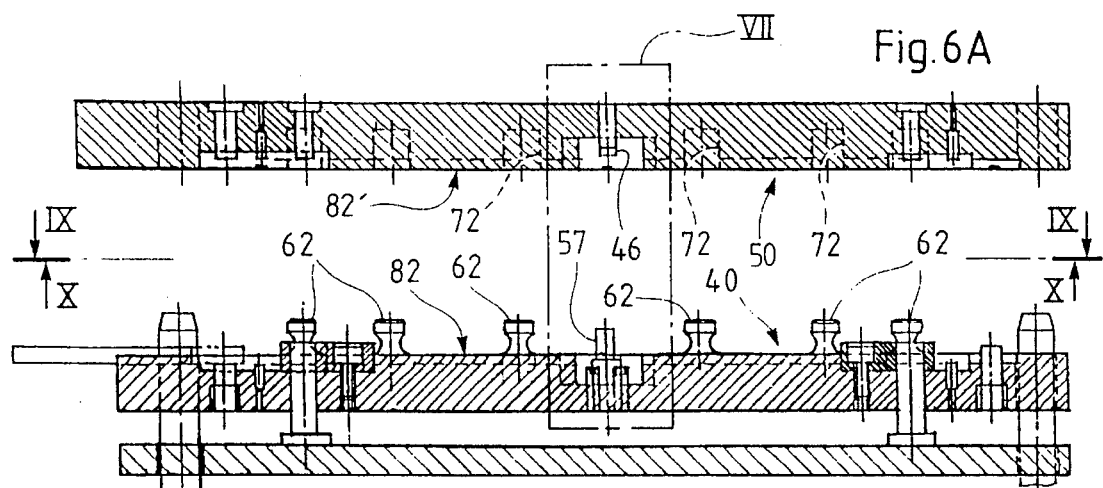
Fig.6A
Fig.6B
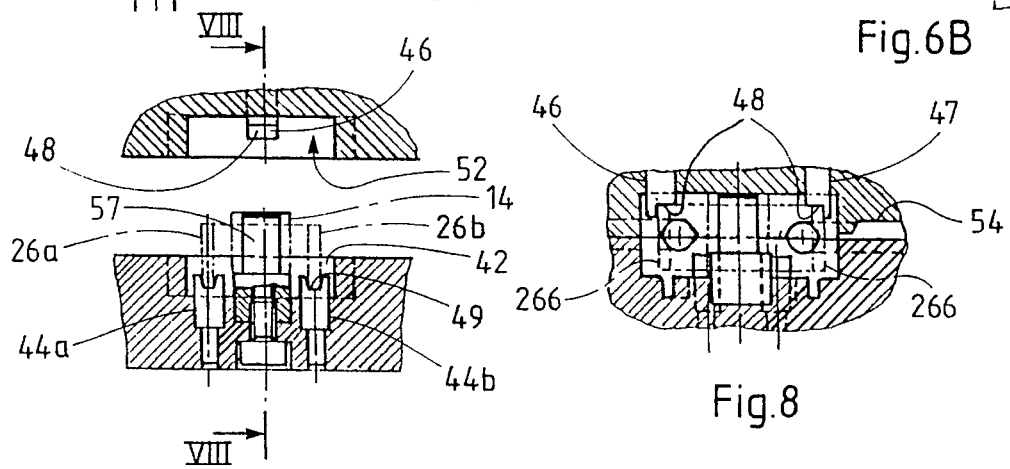
Fig.7
Fig.8
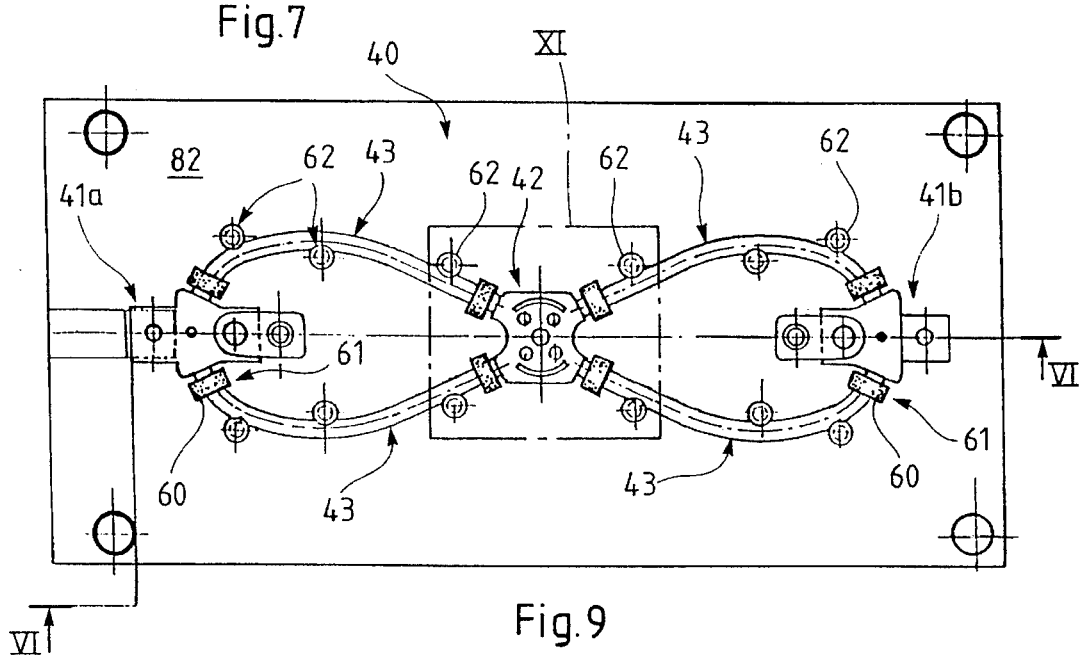
Fig.9

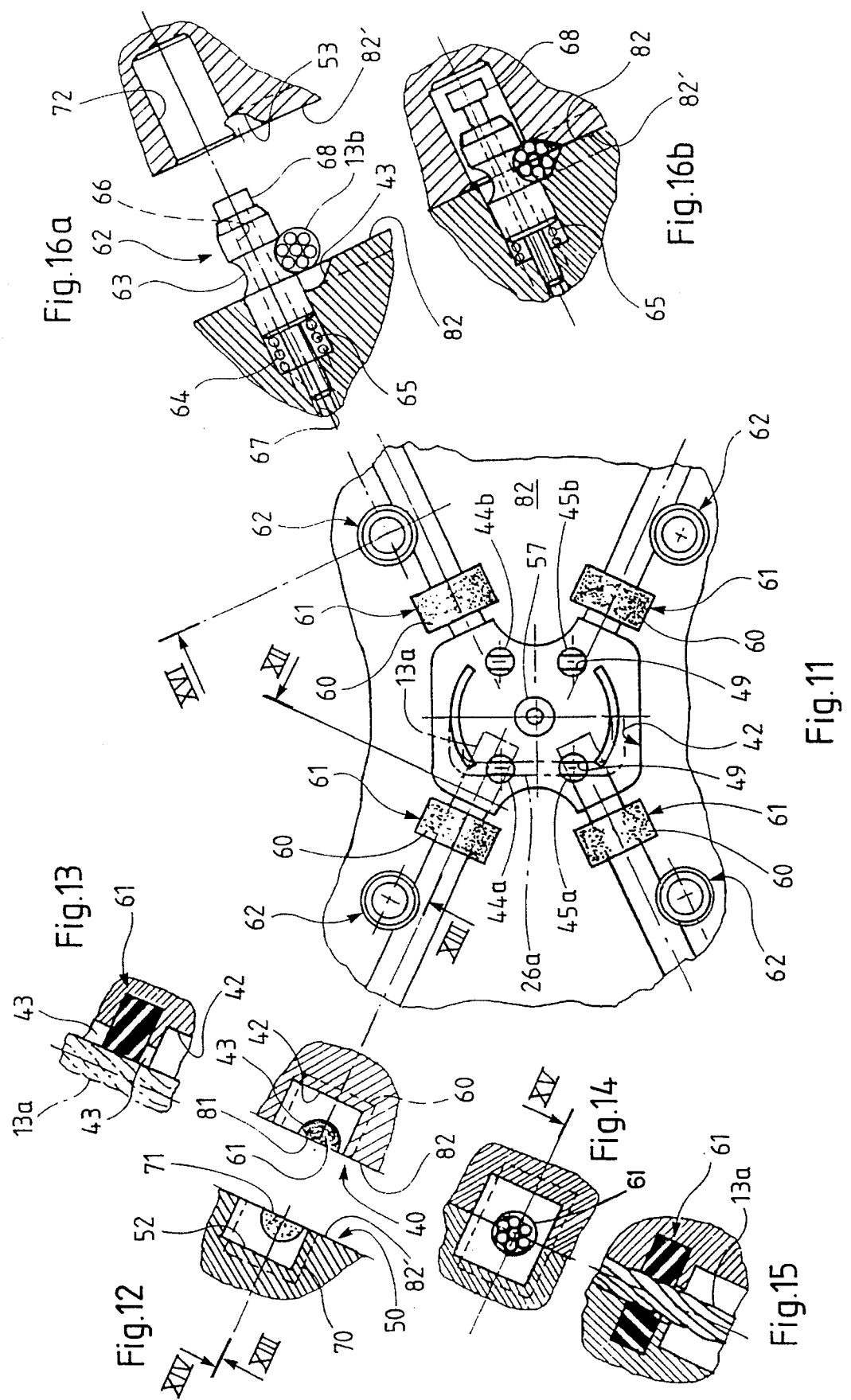

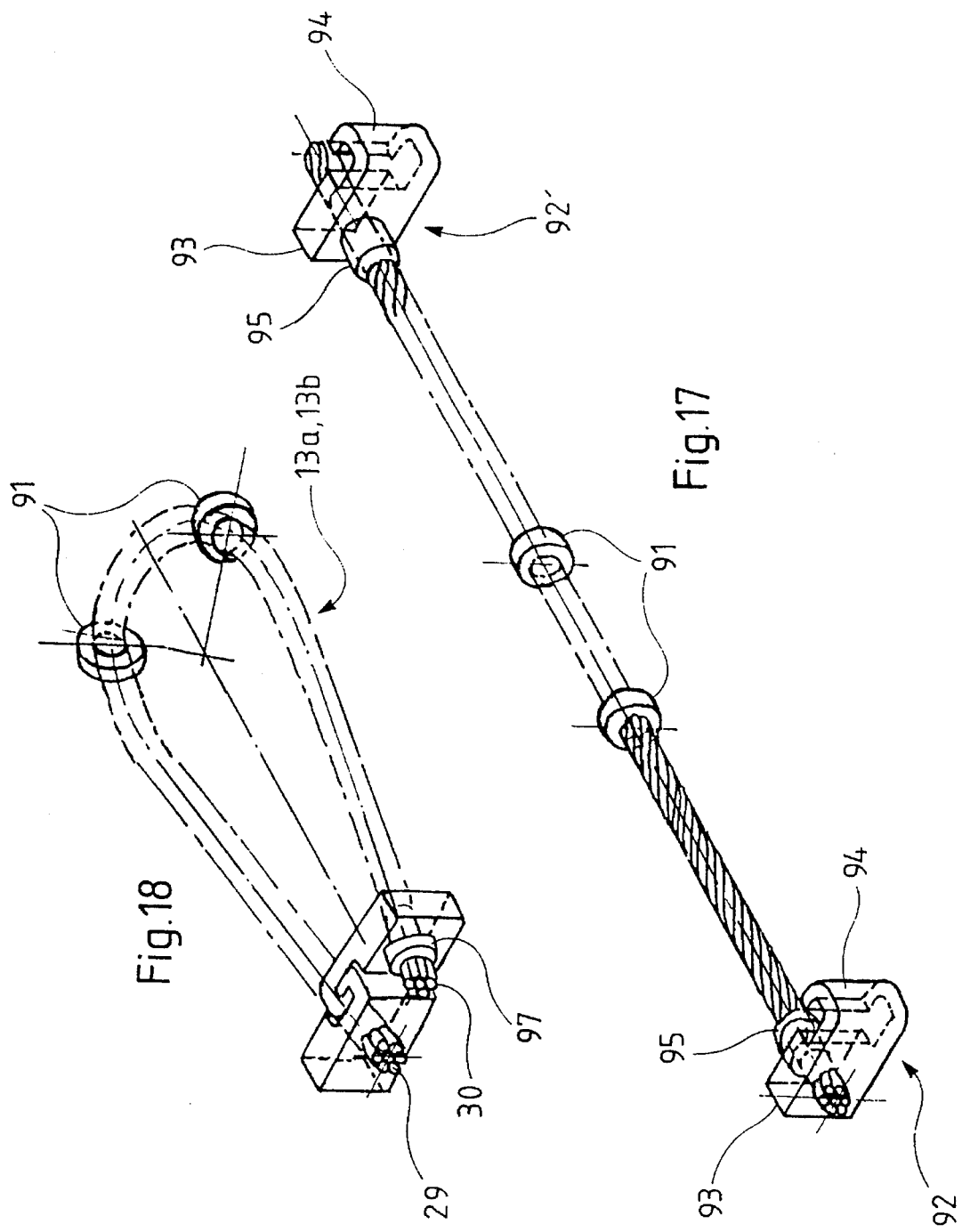

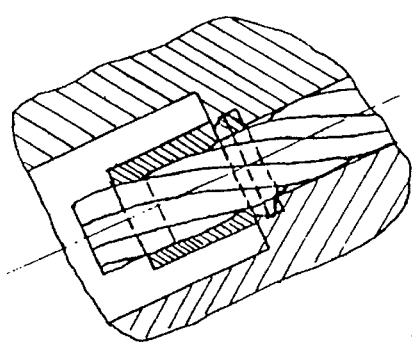
Fig. 24
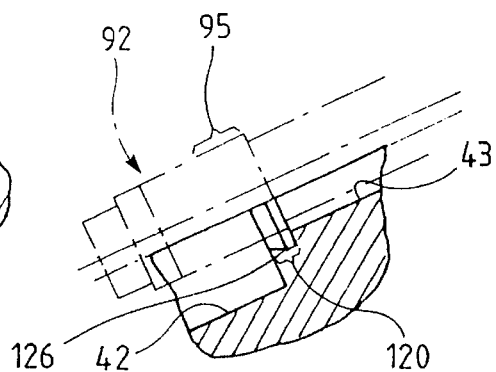
Fig. 23
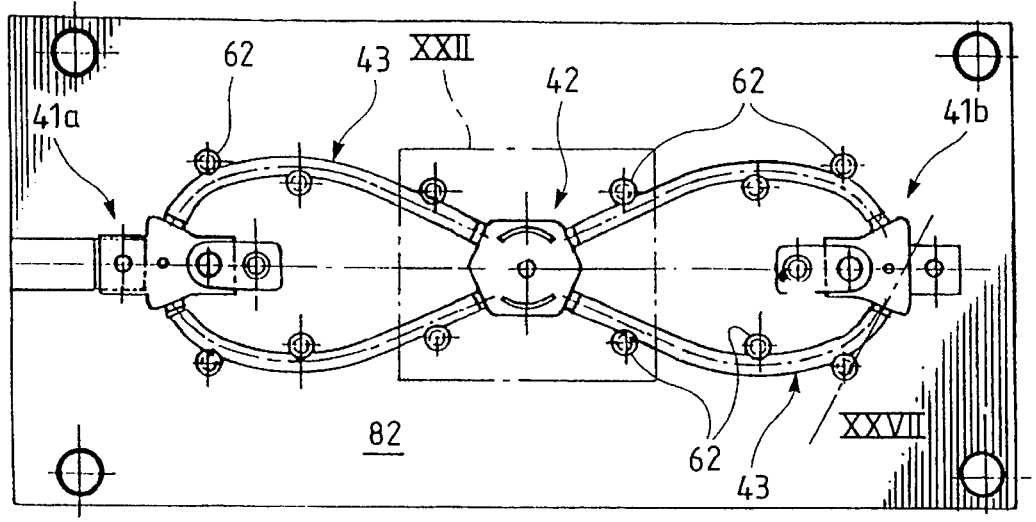
Fig. 21
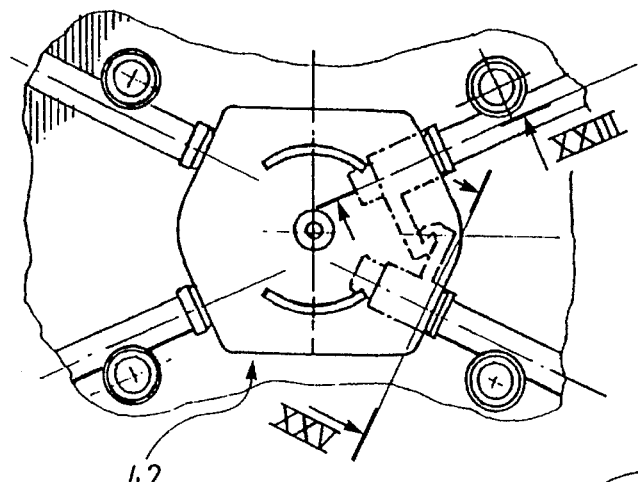
Fig. 22
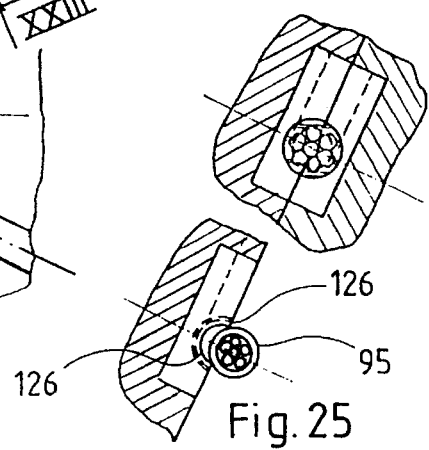
Fig. 26
Fig. 25

ANTIVIBRATION/ANTISHOCK DEVICE AND THE PROCESS FOR THE FABRICATION OF SUCH A DEVICE

FIELD OF THE INVENTION

The present invention relates in general to antivibration/antishock devices. More specifically, it concerns an antivibration/antishock device of the type which has a carrier element and a carried element connected by cable, the carrier and carried elements each having at least two anchoring points for the cable placed in the neighborhood of the apices of a polygon with n apices, the cable being alternately anchored to a point on the carrier element and to a point on the carried element, and being oriented on the anchoring points of a first at least of said elements in a roughly transverse direction to the radial direction. It also concerns a process of the fabrication of such a device.

BACKGROUND OF THE INVENTION

Such devices have been the object of French patent application FR-A-2.601.739. FIG. 1 shows an embodiment of such an antivibration/antishock device, wherein the polygons are reduced to their simplest expression, because they both consist of a line segment, the cable being alternately anchored to an anchoring point of the carrier element and an anchoring point of the carried element, the cable being oriented on the anchoring points concerned, in a direction roughly transverse to the radial direction (the direction of the line segment linking the two anchoring points on the element concerned).

FIGS. 2 to 5 illustrate another embodiment, in which the polygons, consisting of the carrier and carried elements, are in this case square, wherein the cable is anchored to each of these elements, in a roughly transverse direction to the radial direction, that is to say to the line segment joining the anchoring point to the center of the square concerned.

The present invention concerns an improvement of the process of fabrication of these elements which are also described in this document.

First, the Applicant has found that the antivibration/antishock devices such as those described in the previous patent application have a large volume, and this is unfavorable in terms of storage and transport. The Applicant therefore sought to devise a means enabling the storage of such shock absorbers or their transport in conditions in which the antivibration/antishock device does not occupy the volume that it occupies when it is mounted.

SUMMARY OF THE INVENTION

The present invention solves this problem, because it proposes an antivibration/antishock device of the type recalled above, wherein one of the carrier or carried elements is of modular construction and contains, on the one hand, individual anchoring modules, and, on the other, means for assembling them. Further, the process conforming to the invention has the following features:

in a first so-called 'anchoring' phase, the cable is anchored in each of said anchoring modules of the modular element, and in the other element, and, in a second phase, the modular element is assembled.

Thanks to these arrangements, the present invention solves the problem of storage and transport. The fact that one of the carrier and carried elements consists of a plurality of individual anchoring modules and of assembly means makes it possible, on completion of the first fabrication phase, to obtain an antivibration/antishock device, partially mounted, but capable of being inscribed in a plane and consequently of being stored flat. On the termination of storage, or of transport in the same conditions, the second fabrication phase in which the modular element is assembled can be carried into practice. This phase can be made particularly easy on the assumption that the means for assembling the anchoring modules are cogging or plugging means.

In a preferred embodiment, the cable is anchored, in a roughly transverse direction to the radial direction, to only one of the carrier or carried elements. In this preferred embodiment, it is the element in which the cable is anchored in a transverse direction to the radial direction which is chosen as the modular element. Further, the cable is subdivided into the same number of cable conductors as anchoring modules, and each cable conductor is associated with one of these modules.

Thanks to these arrangements, the fabrication, and especially the assembly phase of the device, are facilitated. At the end of the anchoring phase, the carrier loops of the modular elements are arranged in a star around the non-modular element, while each cable conductor is anchored, on the anchoring modules, in a roughly transverse direction to the radial direction. When, during the assembly phase, the modular element is assembled, the force that has to be applied to the conductors, at the level of the anchoring modules, is a torsion force of the cable combined with a bending force, and this combination of forces is lower than the force that would have to be applied if the cable were not anchored in a transverse direction to the radial direction, in which case the force would have to be a very high bending force.

However, in other embodiments, owing to requirements other than those state heretofore, one can choose as the modular element the one in which the cable is not anchored in a roughly transverse direction to the radial direction.

In the preferred embodiment, and according to a highly advantageous feature of the present invention, one at least of said carrier and carried elements is at least partially fabricated by moulding, and this moulding takes place during the anchoring phase. Preferably, both the carrier and carried elements are at least partially fabricated by moulding, with the moulding operation carried into practice in a single step.

This set of arrangements is particularly advantageous because it helps to lower the cost of the antivibration/antishock device significantly, in comparison with the prior art consisting in particular of the patent application heretofore mentioned, in which the carrier and carried elements are fabricated by the assembly of metallic parts, and the cable anchorings are provided by the squeezing of the cable between two distinct metallic parts. In this prior art, each cable anchoring point requires several fabrication operations, some of which must be carried out sequentially. This means, on the one hand, that the assembly time is especially long, and, on the other, that various parts must be fabricated separately.

Thanks to the features of the invention recalled above, it is possible to combine, at least partially, the anchoring operation and fabrication of the parts making up the carrier and carried elements. Further, in the preferred embodiment, all the parts and the cable anchoring in these parts is carried into practice in a single moulding operation, preceded by the positioning of the cable conductors inside the mould. The person skilled in the art can appreciate the economy of time and means employed for the fabrication of an antivibration/antishock device.

In this embodiment, and if necessary, it may be possible to use an assembly yoke into which the two ends of a cable conductor are inserted to make a loop.

This arrangement is particularly advantageous because it serves:

to facilitate the operation of placing the loops in the mould, to reinforce the anchoring of the ends of the cable conductor.

During the moulding operation, in fact, especially if this operation is carried into practice by injection, the molten plastic penetrates between the different wires making up to strands of the cable conductor, at the ends of the conductor, and this causes a slight increase in volume at these ends, subsequently making it impossible to slide the ends of the cable conductor into the slots of the yoke, due to the jamming resulting from the aforementioned increase in volume.

This fact substantially increases the resistance of the anchoring to pullout. This is why, in the antivibration/antishock device of the present invention, it is possible to avoid anchoring the ends of the cable conductor in a transverse direction to the radial direction, which was not the case in the aforementioned prior art, in which the forces often acted in a radial direction, thus increasing the risk of pullout of the cable in the event that the cable was anchored in a direction parallel to the radial direction.

According to another feature of the invention carried into practice in a preferred embodiment of the process according to the invention, each passage adapted to receive the cable and to enable it to leave a moulding zone is associated with a seal.

During injection, this prevents the molten plastic from escaping the moulding zone, by following the strands of the cable.

In a preferred embodiment, the seal consists of a block of elastomer adapted to match, at least partially, around the cable.

In another preferred embodiment, the seal consists of a cylindrical aluminum supporting surface directly moulded on the cable.

BRIEF DESCRIPTION OF THE FIGURES

The above and other objects and advantages of the invention will be apparent from the following description taken in conjunction with the accompanying drawings wherein:

FIG. 1 is a perspective view of a preferred embodiment of the device of the invention, FIG. 2 is a view of the same device, on completion of the anchoring phase of the cable conductors, FIG. 3 is a schematic view of a loop formed with a cable conductor and a yoke, according to a preferred embodiment of the invention, FIG. 4 is a perspective view of a part of the device shown in FIG. 1, FIG. 5 is a perspective view of the yoke shown in FIG. 3, FIGS. 6A and 6B are longitudinal cross-sections along line VI—VI of FIGS. 9 and 10, and represent the mould used in a preferred embodiment of the process of fabrication of the invention, FIG. 7 is an enlarged view of inset VII of FIGS. 6A and 6B, FIG. 8 is a transverse cross-section along line VIII—VIII of FIG. 7, but illustrates the assembly when the mould is closed, FIG. 9 is a plan view along the line and the arrows IX of FIG. 6 and shows the lower portion of the mould shown in FIG. 6B, FIG. 11 is an enlarged view of inset XI of FIG. 10, FIG. 12 is a view along line XII of FIG. 11, FIG. 13 is a partial cross-section along line XIII of FIG. 12, FIG. 14 is a view corresponding to FIG. 12 but shows the assembly when the mould is closed, FIG. 15 is a view corresponding to FIG. 13, but shows the assembly when the mould is closed, FIG. 16a is a cross-section along line XVI of FIG. 11, and also shows a partial cross-section of the portion corresponding to the lower and upper portions of the mould, with the mould open, FIG. 16b corresponds to FIG. 16a and shows the assembly when the mould is closed, FIG. 17 shows the arrangement of a cable conductor designed to form a loop, according to another preferred embodiment of the device of the present invention, FIG. 18 is a view corresponding to FIG. 3 and shows the loop formed according to this second embodiment, FIG. 21 is a view corresponding to FIG. 9 and shows the portion of the lower mould used to fabricate the device of the second embodiment, FIG. 22 is an enlarged view of inset XXII, FIG. 23 is a partial cross-section along line XXIII of FIG. 22, FIG. 24 is a view corresponding to FIG. 23 and shows the assembly when the mould is closed, FIG. 25 is a view along line XXV of FIG. 22, FIG. 26 is a view corresponding to FIG. 25 and shows the assembly when the mould is closed.

DESCRIPTION OF THE PREFERRED EMBODIMENTS

Figure 10:
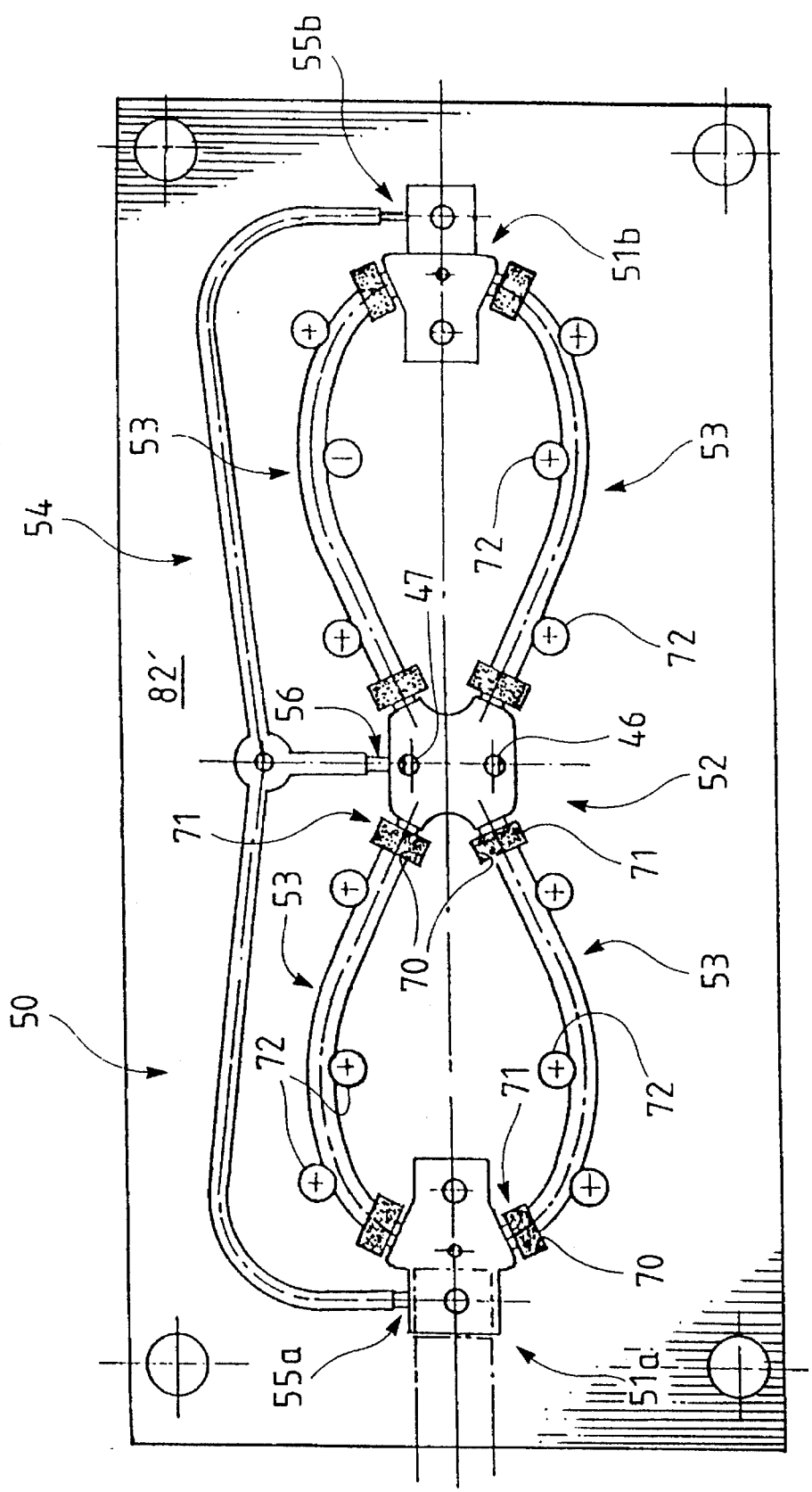
FIG. 10 is a bottom view along the line and arrows X of FIGS. 6 and shows the upper portion of the mould shown in FIG. 6A.

With reference to FIGS. 1 to 5, a first embodiment of an antivibration/antishock device of the invention is described.

According to the embodiment selected and shown in FIGS. 1 and 2, an antivibration/antishock device 10 has a carrier element 11 and a carried element 12 linked by the cable 13 forming a shock-absorbing means. The device here is designed to carry a mechanism that generates vibrations, this mechanism being fixed to the carried element 12 by a screw adapted to cooperate with an insert 14 essentially comprising a threaded bore and integral with the carried element 12.

FIG. 2 shows the antivibration/antishock device in the unassembled position. It can be seen here that the carrier element 11 is of modular construction and that it has two individual anchoring modules 11a and 11b. The modular element also has means enabling the assembly of the anchoring modules 11a and 11b, these means consisting here of a rectangular tab 15 carried by the modular element 11b, this tab itself having a central hole 16, and a recess 17 of a complementary form to the tab 15 carried by the modular element 11a. A central hole 20 penetrates entirely through the horizontal walls 18 and 19 of the recess 17, while this tab is provided with a corresponding hole 16. It may be observed that these assembly means actually consist here of a plugging device (of the tab 15 in the recess 17) and a key device. In effect, the holes 16 of the male connector 15 and 20 of the female connector 17 are aligned, when these connectors are assembled, and enable a key 21 (FIG. 4) to lock the assembly. The key 21 is integrated in a part 22 which also has a plate 23 and two lateral surfaces in the form of an arc of circle 24 and 25 (FIGS. 1 and 4).

In each of the anchoring modules 11a and 11b, the cable 13 is anchored so that it is oriented, on the anchoring point, along a roughly transverse direction to the radial direction (shown schematically by axes 23a and 23b). In fact, in the anchoring zone 140 of the cable 13 in the modules 11a and 11b, the cable forms a curve which, at the point of its intersection, 140a, respectively 140b, with the axes 23a, respectively 23b, is tangent to a direction that is itself perpendicular to said axes 23a and 23b. The anchoring is carried into practice here by moulding, according to the process that will be described below, of the modules 11a and 11b directly on the cable 13. It may be observed that the cable is held on the overall section in the form of an arc imprisoned in module 11a (or 11b), on either side of the point 140a (or 140b).

The carried element 12 is, here, partially made of moulded plastic. However, in this embodiment, the cable is subdivided into two conductors 13a, 13b. According to one aspect of the invention, it is first anchored in a preanchoring device, here a yoke 26a, 26b associated with each of the cable conductors 13a, 13b. Each yoke 26a, 26b consists of a steel part, roughly in the shape of a horseshoe. In the branch of the part that joins the two side branches, the yoke has two slots 27 and 28, having a width substantially smaller than the diameter of the cable 13, as shown in FIG. 3. The bottom of each slot is semi-circular.

The ends of the cable conductors 13a and 13b are introduced into the slots 27, 28 of the yoke 26a, 26b concerned, so that a loop is thus formed, as shown in FIG. 3, with each of the cable conductors 13a, 13b. At the level of the slots, the cable conductor is simply held in the yoke, because the width of the slots is slightly smaller than the diameter of the cable. In other embodiments, a tack weld can be added. In any case, the cable, which is a steel cable 8 mm in diameter here, has a natural tendency to resume its original form elastically, that is to say straight. Consequently, the ends 29, 30 of the cable strands 13a, 13b exert a force towards the exterior of the yoke, in the direction of the arrows 31, and this, even in the absence of a tack weld, facilitates the holding of the loop in the yoke. The overall part 12, with the insert 14, is then directly moulded around the ends 29, 30 of the cable conductors 13a, 13b associated with their respective yokes 26a, 26b, according to the process that will be described below.

In this embodiment, when the parts 11a, 11b and 12 are moulded directly on the cable, thus totally (on parts 11a, 11b) or partially (on part 12) achieving the anchoring of the cable, one can then assemble the modular elements 11a, 11b, as shown in FIG. 1, by proceeding with the plugging of the tab 15 followed by keying, by socketing and cementing of the part 22 bearing the key 21 in the holes 16 and 20.

Note that, in the embodiment selected and represented, the anchoring of cable in the carried element 12 is done in a direction that is roughly parallel to the axis of symmetry of the system, that is to say to the radial direction shown in FIG. 2 by axes 23a and 23b. The cable conductors 13a, 13b are anchored in the carried element 12 at the level of their ends 29, 30, and the length of the section of cable imprisoned in part 12a, at the level of the ends 29 and 30, constitutes the anchoring of the cable in the carried element 12. The anchoring sections are references 141, 141' in FIGS. 1 and 2.

Because of the pre-anchoring of the cable conductor 13a, 13b in a yoke 26a, 26b, and because of the fact that, according to the process that will be described below, the part 12 is moulded by injection, the molten plastic penetrates between the different wires and strands, at the level of the ends 29 and 30 of the cable, thus causing a slight increase in the volume of these ends. This causes the natural jamming of the cable conductors 13a, 13b in the yokes 26a, 26b. Consequently, even if high forces in the radial direction are applied to the cable conductor (such as those exerted when the cable conductors are adjusted to take the form shown in FIG. 1), the assembly sufficiently resists such forces and there is no need to guide the cable, at the level of the carried element 12, in a roughly transverse direction to the radial direction.

On the contrary, at the level of the carrier element and of the modules 11a, 11b, the anchoring of the cable 13 along a roughly transverse direction to the radial direction is particularly advantageous, because it facilitates the shape adjustment of the cable conductors 13a, 13b during the cogging of the elements 11a and 11b. In fact, the force to be applied at the level of these elements is essentially a low torsion force of the cable (but with a lever arm, generated by the length of the modular elements), combined with a low bending force of the cable, the combination of these forces being lower than the bending force that would have to be applied if, on the modular elements 11a and 11b, the cable 13 was anchored in a parallel direction to the radial direction.

In the embodiment selected and represented, the body of the carried element 12 also has two lateral surfaces 33 in the form of an arc, of which the radius of curvature corresponds to that of the surfaces 24 and 25 of the part 22. The group of surfaces 24, 25 and 33 allows the lateral maintenance of a spring 35 which can, optionally in this embodiment, be inserted between the carrier element 11 and the carried element 12. In certain applications, this spring helps to increase the nominal load of the device.

The features of the antivibration/antishock device described here are the following:

cable 8 mm in diameter, cable conductor with a useful length of 280 mm, nominal load $M_c$ of the antivibration/antishock device represented in the absence of spring 35: 13 kg, nominal load $M_{Rt}$ of the spring: 80 kg, nominal load of the antivibration device with spring 35: 93 kg, dynamic stiffness $K_c$ of the antivibration/antishock device without spring: 12,855 N/m: in view of the nominal mass of 13 kg, this gives a resonance frequency of about 5 Hz (calculation by the formula mentioned on page 2 of document FR-A-2.601.739), dynamic stiffness $K_{Rt}$ of the spring: 79,110 N/m: in view of the nominal load ($M_T = M_{Rt} + M_c$) of the device with spring (93 kg), this gives a resonance frequency of about 5 Hz. Note that the resonance frequency of the device with and without spring is mathematically the same.

However, since the shock-absorbing antivibration/antishock device is non-linear and is associated with a spring which is a linear system, the resonance frequency of the device with spring 35 is liable to vary slightly, in accordance with the vibratory excitation, and for a static deflection of the device which is identical with and without spring.

It may further be noted that the fixing brackets 98, 99 are integrated in each of the modular elements 11a, 11b, so that when the overall device is assembled, as shown in FIG. 1, these fixing brackets are located towards the exterior of the device, allowing easy fixing of the device.

With reference to FIGS. 6 to 16, a preferred embodiment of the anchoring phase of the process of the invention is described.

In this embodiment, the anchoring of the cable conductors 13a, 13b in the carrier element 11 and carried element 12 is essentially done during the moulding of the parts 11a, 11b and 12, the cable conductors 13a, 13b having previously been inserted into the slots 27, 28 of the yokes 26a and 26b. With reference to FIGS. 6 to 16, a description is now provided of the mould used to carry out the moulding of the bodies of the elements 11a, 11b and 12 directly on the cable, which also achieves the anchoring of the cable on these elements.

FIGS. 6A and 6B illustrate, in a longitudinal cross-section, the upper and lower portions of the mould used, while FIGS. 9 and 10 respectively illustrate, along arrows IX and X of FIGS. 6A, 6B the same portions of the mould.

The lower portion of the mould shown in FIGS. 6B and 9 has a plate 40 which itself comprises a plane surface 82, called the 'joint plane', in which are essentially arranged, on the one hand, the lower moulding cavities 41a, 42 and 41b of the parts 11a, 12 and 11b and, on the other, a cable route cavity 43 designed to accommodate the cable conductors 13a, 13b during the moulding operation. Symmetrically, the upper portion of the mould shown in FIG. 6A and 10 has an upper plate 50 which itself comprises a plane surface 82' also called the 'joint plane' in which are essentially arranged, on the one hand, the upper moulding cavities 51a, 52 and 51b of the parts 11a, 12 and 11b and, on the other, a cable route cavity 53. The upper plate also has an injection channel 54 feeding the injection points 55a, 56 and 55b of the moulding cavities 51a, 52 and 51b. Since the injection moulding system is classic both in its nature and in its structure and operation, it is not described in further detail here.

The cable route 53 made by the cavities 42 and 52 have a semi-circular cross-section, corresponding to the semi-circular cross-section of the cable conductor 13a or 13b, so that, when the mould is closed, the cable routes 43, 53 imprison the cable 13.

The cavity 42 has four projecting points 44a, 44b, 45a and 45b, while cavity 52 has two projecting points 46 and 47.

In FIG. 11, which is an enlarged view of inset XI of FIG. 9, the cable conductor 13a has been shown by mixed lines. During the moulding operation, each of the loops formed respectively by the cable conductor 13a and the yoke 26a on the one hand, and the cable conductor 13b and the yoke 26b on the other, is positioned in the cavities 41 and 42, and in the cable route 43. It may be observed in FIG. 11 that the yokes 26a and 26b are positioned on the support points 44a, 45a, 44b, 45b. The points 44a, 45a, 44b, 45b each has for this purpose a diametral slot 49, able to maintain the yoke 26a or 26b concerned (only the yoke 26a has been shown by mixed lines in FIG. 11). Similarly, the projecting points 46 and 47 each has a slot 48, able to seize the yokes 26a, 26b on the upper edge 55 of their side branches. It may be observed in FIG. 8 that, when the yokes 26a, 26b are placed in the cavity 42, their front edges 56 are contiguous, so that the slot 48 of the point 46 or 47 overlaps the upper edges 55 of the two yokes 26a, 26b.

The moulding cavity 42 also has a central stud 57 designed to receive the insert 14 to position it before the closure of the mould (insert 14 being shown by mixed lines in FIGS. 7 and 8).

With reference to FIGS. 9 to 15, a first preferred solution to the problem of tightness during injection is described. This first solution essentially consists of the use of elastomer blocks. The Applicant was faced with the problem of tightness because, since the cable route 43, 53 is linked to the moulding cavities 41, 42, 51, 52, during injection, the molten plastic is liable to leak along the strands making up the cable conductor. The Applicant sought to devise a solution to this technical problem: a first preferred solution is now described.

In the neighborhood of the junctions between the cable routes 43, 53 with the moulding zones 41, 42, 51, 52, rectangular recesses 60, 70 are provided in the plates 40 and 50, able to receive the rectangular elastomer blocks 61, 71. Each seal 61 (lower plate) 71 (upper plate) is positioned level with the joint plane 82 or 82'. The seals 61, 71 are designed to be crushed by the cable when the mould is closed as described below with reference to FIGS. 12 to 15.

The arrangement of the seals is illustrated in FIGS. 12 and 13, which show the arrangement of the seal 61 represented at the top left of FIG. 11.

In FIGS. 12 and 13, reference 42 indicates the bottom of the moulding cavity at the level of line XII of FIG. 11. In FIG. 12, the cable route 43 is visible, and similarly (by a dotted line) the recess 60 of the elastomer seal 61, the latter being illustrated in a cross-section in FIG. 13. It may be observed that the seal 61, which is also visible in FIG. 12, has its upper face 81 level with the joint plane 82 of the first portion of the mould 40.

Similarly, FIG. 12 illustrates the corresponding portion of the upper portion of the mould 50, showing the bottom of the cavity 52, level with the line XII, the recess 70 of the seal 71, and it may be observed that the upper face of this seal is level with the joint plane 82'.

FIGS. 12, 13 illustrate the cable conductor 13a, when the latter is placed on the seals 61 crossing the cable route 43.

Owing to the fact that, at the beginning of the moulding operation, the cable conductor loops 13a, 13b rest on the seals 61, the inventor was faced with a problem of maintaining them in place. To guide the cable, and to keep it in place until the mould is closed, the inventor associated positioning studs 62 with the cable route 43. One of these studs is visible in detail in FIGS. 16a and 16b. It may be observed, particularly in FIGS. 9, 11 and 16a, 16b, that the studs 62 partly encroach on the cable route 43. To permit the passage of the cable 13, they themselves have a round groove 63 presenting in a transverse cross-section a curvature similar to that of the cable 13. Each stud 62, which also has a cylindrical shape, is mounted in a cylindrical recess 64 at the bottom of which a helical return spring 65 is arranged. Further, the stud 62 has an axial hole 66 while, at the bottom of the recess 64, a threaded hole 67 is made. The assembly also has a screw 68 passing through the axial hole 66 of the stud 62, screwed into the threaded hole 67. It may accordingly be observed that the stud 62 is mobile along the body of the screw 68 inside the recess 64, but that, when the mould is open, the study thrusts against the head of screw 68 by the effect of the return spring 65.

The portion of mould 50, opposite the stud 62, has cylindrical recesses 72 able to accommodate the studs 62 when the mould is closed.

Various steps of this embodiment of the anchoring phase are now described.

As described above, the first operation consists of making the loops with the cable conductors 13a and 13b, inserting the ends 29 and 30 of the cable conductors into the slots 27 and 28 of the yoke 26a or 26b. Thus two loops are obtained like those illustrated by reference 13b in FIG. 3.

In the second step, each of the loops thus made is positioned in the lower portion of the mould 40. The yokes 26a and 26b then rest on the projecting pints 44a, 45a, 44b and 45b as explained above. The cable itself is inserted between the studs 62 arranged on either side of the cable route 43. As explained with reference to FIG. 16a, the cable is also inserted into the grooves 63 of the studs 62. They then rest on the upper face of the elastomer seals 61, and are accordingly positioned and held above the joint plane 82 of the first portion of the mould 40 (see in particular FIGS. 16a, 12 and 13 where the cable 13a or 13b is illustrated).

The insert 14 is then positioned on the positioning point 57 during this second step.

In the next step, the mould is closed. The moulding mechanics, and especially the supports of the mould portions, are classic, and do not need to be described in detail here.

During the closure, the recesses 72 of the upper portion of the mould 50 overlap the corresponding studs 62. When the cable route 53 comes into contact with the cable 13a, 13b, it applies a pressure to this cable and forces it to penetrate into the cable route 43 of the lower portion of the mould 40, and the cable pushes downward the studs 62 which compress the spring 65. Simultaneously, a pressure is applied by cable 13a or 13b against seals 61, 71, so that these seals are elastically deformed, and surround the cable.

When the joint planes 82, 82' are in contact (see FIGS. 14, 15 and 16b), the cable 13a, 13b is imprisoned in the cable routes 43, 53, while the studs 62 have been forced inside the recess 72, by the action of the spring 65, and take the position shown in FIG. 16b. Further, since the elastomer used to make the seals 61, 71 is incompressible, when the seals 61, 71 are engaged in a recess corresponding to their initial volume, they are elastically deformed while exhibiting a tendency to recover their initial shape. They accordingly surround the cable and penetrate into the interstices between the strands of the cable conductor, matching the outer shape of these strands and accordingly producing the desired seal.

In a fourth step, the molten plastic is injected through channel 54, using the classic means in the art of injection moulding.

This is followed by the opening of the mould and ejection of the assembly, which exhibits the form illustrated in FIG. 2.

It may be observed that the cable is in fact maintained before and after closure of the mould by the grooves 63 of the studs 62. In these conditions, the cable routes 43, 53 may not necessarily display a cross-section corresponding to that of the cable. It is necessary, and sufficient, for a space to be arranged in the plates 40 and 50 to accommodate the thickness of the cable when the mould is closed.

With reference to FIGS. 17 to 27, another embodiment of the device and of the process of the present invention are now described.

In the variant that is now described, the reference numbers previously used are retained for the elements having a similar structure to those already described.

This embodiment variant is particularly advantageous when the cables 13a and 13b have a relatively large cross-section (for example, of about 16 mm$^2$). In fact, when the cable has such cross-sections, the strands have relatively large dimensions because they may be up to 5 mm in diameter. In these conditions, the inter-strand passages have a particularly large volume, and this may raise a problem of tightness on the assumption that the moulding is carried out with the sealing process described earlier. In effect, it is possible that the elastomer of the seals 61, 71 will not be sufficiently deformed to fill the inter-strand voids, so that molten plastic under pressure could leak during the injection.

This problem is solved in the aspect of the invention described here by providing the cable conductors 13a, 13b with seals consisting of cylindrical sealing surfaces directly moulded on the cable. In FIGS. 17 and 18, these surfaces have the references 91 and 95. The surfaces 91 are presented here in the form of independent rings, while the surfaces 95 are associated with parts 92, 92' described below.

In the present variant, it is also proposed to mould two pre-anchoring devices of aluminum by gravity on the cable, in this case the holding parts 92, 92' designed to replace the yokes 26a and 26b previously described. These parts, which are of substantially different shape, both have a body, roughly parallelepipedic 93, arranged around the cable 13, having a portion 94 in the form of a hook. The two parts 92, 92' are substantially different in shape and arranged on the cable with their hook 94 in the same direction, so that, when a loop is formed, as shown in FIG. 18, the portions 94 forming hooks lock into each other, thus ensuring the provisional holding of the cable loop 13a or 13b during the moulding operations, a function previously performed by the yokes 26a and 26b.

The parts 92, 92' also have a cylindrical seal surface 95. To have the same length and the same hold on the cable as part 92, the holding part 92' also has an annular reinforcement portion 97.

It may also be observed that the parts 92, 92' also contribute to the rigidity of the carried element 12, a function also performed in the embodiments previously described by the yokes 26a, 26b.

Further, during the gravity moulding operations, which are now described below, the aluminum used to make the parts 92, 92' flows between the strands and the wires making up the cable 13, thus contributing to a good consolidation of the parts 92, 92' on the cable 13.

Finally, as in the embodiment previously described, during the injection of molten plastic, this plastic also penetrates between the strands and wires of the ends 29, 30 of the cables conductors 13an 13b, thus causing an increase of their volume, which increases the pullout resistance of the assembly.

For the rest, the antivibration/antishock device has the same structure as the one described above with reference to FIGS. 1 to 4.

The process permitting gravity moulding of the parts 91, 92 and 92' directly on the cable 13 are now first described.

Figure 20:
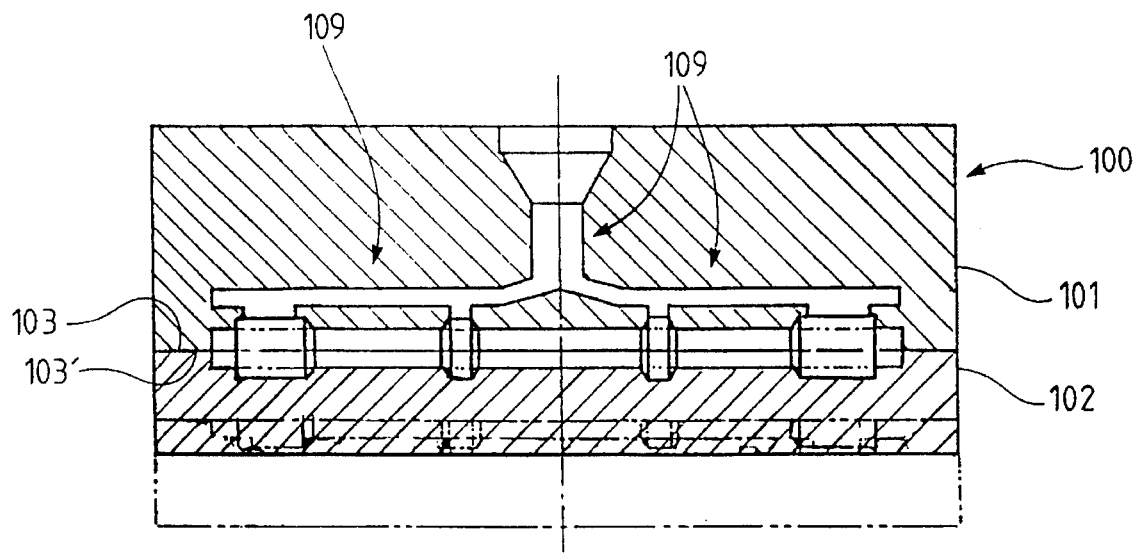
FIG. 20 is a longitudinal cross-section along line XX—XX of FIG. 19.
Figure 19:
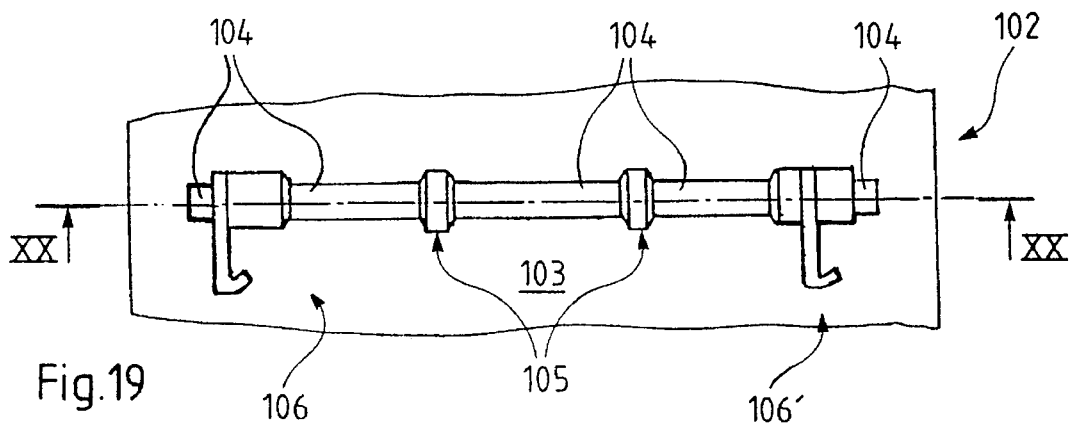
FIG. 19, is a view of a portion of the lower mould designed to carry into practice the cable conductor shown in FIG. 17.

The mould used in this embodiment is shown schematically in FIGS. 19 and 20. The mould 100 illustrated in these figures has an upper portion of mould 101 and a lower portion of mould 102. The mould 100 is illustrated in the closed position, with the joint plane 103 of the lower portion of mould 102 and the joint plane 103' of the upper portion of mould 101 being in contact. In FIG. 20, the bottom portion of mould 102 has also been shown by a mixed line in the open position.

In FIG. 19, the cavity of the lower portion of mould 102 has been represented. This cavity comprises:

five cable route cavities 104, designed to receive the cable conductor 13a, 13b during the moulding operation, two cavities 105 corresponding to the seal rings 91, and two cavities 106, 106' whose shape corresponds to that of the parts 92, 92' including that of the surfaces 95 and that of the portion 97 associated with the part 92'.

The upper portion of mould has similar cavities, surmounted by a channel 109 with a relatively wide cross-section and capable of permitting the flow of molten aluminum by gravity.

These flow channels are not described in further detail here, since the moulding of aluminum parts by gravity is well known to the person skilled in the art.

To make the cable conductor 13a or 13b with the aluminum parts shown in FIG. 17, the cable conductor is first positioned in the cable route made by the sections 104. It may be observed that the cable conductor overlaps the cavities 105, 106, 106'. The mould is then closed by any known means and the aluminum poured by any known means.

During stripping, a part such as the one shown in FIG. 17 is obtained, after having cut and ground the points corresponding to the intersections between the cavities of the upper mould portion and the flow channel 109.

It is observed that, during the casting operation, the molten aluminum penetrates into the interstices between the strands and the wires making up the cable 13 opposite the moulding zones 105, 106, 106'. The volume of these interstices is thus filled.

This operation is followed by the assembly of the hooks 94 as illustrated in FIG. 18.

The mould used for the injection of the parts 11a, 11b and 12 is similar to the one described above, particularly with reference to FIGS. 6 to 11. Only the lower part of the mould is illustrated in FIGS. 21 and 22. It may be noted that the recesses made for the elastomer seals have disappeared. These recesses are replaced by cylindrical recesses with an inside diameter corresponding to the outside diameter of the surfaces 91 and 95. These recesses are adjacent to the junction between the cable route 43 and the cavities 41 and 42. The upper portion of the mould, not shown, has an identical arrangement.

Figure 27:
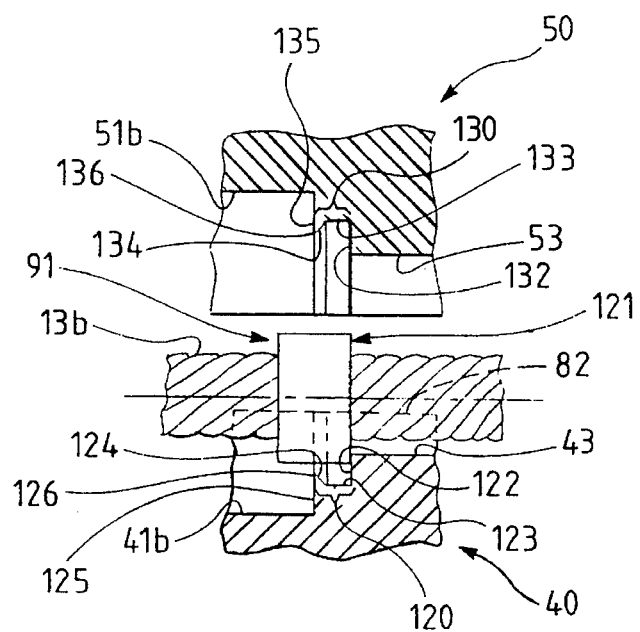
FIG. 27 is a partial cross-section along line XXVII of FIG. 21.

On of these recesses is shown in detail in FIGS. 23 and 24, which illustrate this arrangement at line XXIII, and also in FIG. 27.

FIG. 27 is a partial cross-section along arrow XXVII of FIG. 21. It represents a junction between the cable route 43 and the cavity 41b. The aforementioned recess corresponds to the zone marked by the bracket 120. The cable 13b is shown in this figure. It may be observed that the ring 91 has been moulded on the cable 13b while being positioned on this cable so that one of its faces 121, called the 'external' face because turned outward from the cavity 41b, is placed against an annular wall 122 with a vertical extension of recess 120 delimiting this recess on the cable route side. The bottom of the recess is delimited by a cylindrical wall 123 and a conical wall 124. The conical wall 124 is arranged towards the interior of the recess 120, and is limited by a wall of vertical extension 125 delimiting the cavity 41b, at the level of the intersection between the cable route and the cavity itself.

The wall of vertical extension 125 and the conical wall 124 define a sharp edge with a semi-circular shape 126.

FIG. 27 shows a partial cross-section of the upper portion of mould 50. It may be observed that, at the level of the intersection between the cavity 51b and the cable route 53 is a recess 130 symmetrical and similar to the one described above and delimited by a sharp edge 136. In consequence, the semi-circular sharp edge 136 is inscribed in the same plane as the semi-circular sharp edge 126.

It may be observed in FIG. 27 that the ring 91 has an axial extension greater than that of recesses 120, 130, so that the ring 91 partially penetrates into the cavity zone 42b, 52b.

FIG. 23 is a partial cross-section similar to FIG. 27, but the partial cross-section is made along arrow XXIII of FIG. 22, that is to say at the level of the intersection between the cable route 43 and the cavity zone 42. It may be observed that the recess 120 illustrated therein has the same arrangement, and particularly a sharp edge 126 coming opposite the cylindrical surface 95 of the part 92. The portion of mould 50, opposite the recess 120 associated with the cavity 42, presents a recess 130 of identical structure.

Similar arrangements are made at the level of each of the intersections of the cable route 43, 53 with one of the moulding zones 41, 42 or 51, 52.

It may be observed that, in accordance with this aspect of the invention, the sharp edge 126 (or 136) has a similar geometry to that of the directrice of the surfaces constituting the cylindrical surfaces 91, 95, but with substantially smaller dimensions. When the cylindrical surfaces have a circular directrice (as in the embodiment described and represented here), the sharp edges 126, 136 have a substantially smaller diameter than that of the circular directrice. In this embodiment, the cylindrical surfaces 91 and 95 have an outside diameter of 11 mm (the cable diameter still being 8 mm). The diameter of the circles in which the sharp edges 126, 136 are inscribed is 9.5 mm.

In accordance with the invention, the sharp edges are encrusted in the annular surfaces, thus achieving the desired seal. This incrustation is made possible by the fact that the portions of mould 40, 50 are made of a material (here steel) which has a greater hardness than that of the cylindrical surfaces (here aluminum). FIG. 24 illustrates the mould in the closed position, at the level of one of the annular surfaces. It may be observed that the edges 126 and 136 have effectively penetrated and are encrusted in the cylindrical surface 95 of the part 92 shown in this figure. The same obviously applies at the level of the other annual surfaces 91 or 95 arranged on the cable conductors 13a or 13b.

In this embodiment, before closure and during closure of the mould, the cable 13a or 13b is held by studs 62 identical to those described above. However, in the second step (positioning of the loops), the loops rest via the seal surfaces 91, 95 which bear against the sharp edges 126, without being able to penetrate completely into the recess, due to the difference between the outside diameter of the surface 91 or 95 and that of the sharp edge 126 (see FIG. 25). The height of the studs 62 is then adjusted by the screw 68, in order to bring the groove 63 to the level of the cable.

The rest of the moulding operations are identical to those previously described.

After ejection of the assembly, the assembly has roughly the same shape as the one shown in FIG. 2, with the exception of the surfaces 91, 95, which remain visible.

It may be observed that the present invention makes it possible, on completion of the anchoring phase, to obtain an antivibration/antishock device of which the fabrication is virtually terminated, and which can be stored and transported flat.

During a second phase, the modular element made up of parts 11a, 11b is assembled.

In this embodiment, as described above, the tab 15 is plugged into the recess 17 and keyed by means of part 22.

This second phase can be carried into practice on the site of use of the antivibration/antishock device described here.

Obviously, the present invention is in no way limited to the embodiments selected and represented. It includes all variants within the scope of the person skilled in the art.

In particular, this person is free to provide for a number of loops or cable conductors greater than two.

The person skilled in the art will also be able to carry into practice any other type of moulding of carrier and carried elements, and particularly a gravity moulding of aluminum.

Although the preferred embodiment concerns carrier and carried elements formed by plastic moulding, the use of aluminum may offer the additional advantage of permitting the fabrication of carrier and carried elements that are more rigid than those made of plastic, and are also resistant to solvents, humidity and heat.

We claim:

1. An antivibration/antishock device of the type comprising a carrier element and a carried element linked by cable, the carrier and carried elements each comprising at least two anchoring points for the cable, arranged in the neighborhood of the apices of a polygon with n apices, the cable being alternately anchored to a point of the carrier element and to a point of the carried element, and being oriented on the anchoring points of a first at least of said elements in a roughly transverse direction to the radial direction, wherein a modular element is used as the carrier or carried element, said modular element comprising individual anchoring modules, as well as assembly means of these modules.

2. The device of claim 1 having a helical spring arranged between the carrier and carried elements.

3. The device of claim 2, wherein the carrier and carried elements have means for holding the helical spring.

* * * * *